(12) United States Patent
Miyoshi (10) Patent No.: US 9,791,730 B2
(45) Date of Patent: Oct. 17, 2017

(54) LIQUID-CRYSTAL DISPLAY DEVICE

(71) Applicant: Japan Display Inc., Minato-ku (JP)

(72) Inventor: Akihiko Miyoshi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 96 days.

(21) Appl. No.: 14/719,879

(22) Filed: May 22, 2015

(65) Prior Publication Data

US 2015/0378227 A1 Dec. 31, 2015

(30) Foreign Application Priority Data

Jun. 30, 2014 (JP) .................. 2014-134645

(51) Int. Cl.
*G02F 1/1333* (2006.01)
*G02F 1/1335* (2006.01)
*G02F 1/1362* (2006.01)
*G02F 1/1337* (2006.01)

(52) U.S. Cl.
CPC .. *G02F 1/133371* (2013.01); *G02F 1/133512* (2013.01); *G02F 1/133514* (2013.01); *G02F 1/133707* (2013.01); *G02F 1/133723* (2013.01); *G02F 1/133784* (2013.01); *G02F 1/136213* (2013.01); *G02F 1/136286* (2013.01); *G02F 2001/136218* (2013.01)

(58) Field of Classification Search
CPC ......... G02F 1/136209; G02F 1/133512; G02F 1/133514; G02F 2001/136222; G02F 1/133707; G02F 1/136286; G02F 1/133784; G02F 1/133371; G02F 1/136213; G02F 2001/136218
See application file for complete search history.

(56) References Cited

U.S. PATENT DOCUMENTS

| 7,554,630 | B2* | 6/2009 | Kwon | G02F 1/136209 349/111 |
|---|---|---|---|---|
| 2004/0212761 | A1* | 10/2004 | Kadotani | G02F 1/134363 349/110 |
| 2005/0152230 | A1* | 7/2005 | Konno | G02F 1/134363 369/1 |
| 2011/0001911 | A1* | 1/2011 | Shirai | G02B 5/201 349/106 |
| 2012/0033169 | A1* | 2/2012 | Lee | G02F 1/133512 349/139 |
| 2012/0306797 | A1* | 12/2012 | Misaki | G06F 3/0412 345/173 |

(Continued)

FOREIGN PATENT DOCUMENTS

JP 2009-015160 1/2009

*Primary Examiner* — Jia Pan
(74) *Attorney, Agent, or Firm* — Oblon, McClelland, Maier & Neustadt, L.L.P.

(57) ABSTRACT

An LCD device according to a group of embodiments comprises array and counter substrates, a liquid-crystal layer and a liquid-crystal alignment layer, where the array substrate or the counter substrate further comprises: a pattern of color filter layer, formed of a plurality of color regions; a pattern of light-shielding film, comprising band-shaped portions that run along boundaries of the color regions; and protrusions formed by the color filter layer and run along boundaries of the color regions; and boundaries between the color regions being respectively deviated from centerlines of the band-shaped portions by 1 µm or more.

8 Claims, 5 Drawing Sheets

(56) References Cited

U.S. PATENT DOCUMENTS

2015/0055063 A1* 2/2015 Hsieh ................ G02F 1/133753
349/99
2015/0070634 A1* 3/2015 Jung ................. G02F 1/134363
349/106

* cited by examiner

LIQUID-CRYSTAL DISPLAY DEVICE

CROSS-REFERENCE TO RELATED APPLICATIONS

This application is based upon and claims the benefit of priority from the prior Japanese Patent Application No. 2014-134645, filed on Jun. 30, 2014; the entire contents of which are incorporated herein by reference.

FIELD

Embodiments of the present invention relate to a liquid-crystal display (LCD) device displaying images, and particularly relate to an LCD device having a black matrix and an alignment layer in the view area.

BACKGROUND

The LCD devices are most typical among flat-panel display (FPD) devices and are widely used as display devices for PCs and TV sets, for computer terminals, for vehicle-mounted display devices such as car navigators, and for mobile devices such as smart phones and other mobile phones as well as information terminals or digital assists. A display panel of the LCD device comprises an array substrate and a counter substrate, which are adhered to each other through a sealing material, as well as a liquid crystal layer interposed between these substrates.

The array substrate comprises in general, on its view area or pixel-array area, an array of scanning lines and an array of signal lines that intersect the scanning lines as well as a switching element and a pixel electrode at around each intersection of the signal and scanning lines. Mostly, the array and/or counter substrate have, on their outermost layers contacting the liquid-crystal layer, alignment layers that are typically formed of polyimide resin. The alignment layers are obtainable by forming a resin layer and a subsequent alignment treatment. By the alignment layers, liquid-crystal molecules contacting the alignment layers are aligned in a pre-set direction, at an initial state of no voltage application, and have a pre-tilt angle to a plane of the substrate in such initial state if and as required. The alignment treatment is typically made by rubbing the resin layer with a fabric that is called as a buff and wound around a roller. The alignment treatment may also be made by irradiating the resin layer, typically with UV lights.

When a patterned face of the array substrate or the counter substrate has a relief structure or microscopic slopes, liquid-crystal molecular orientation would be disturbed, and thus, image-displaying would be adversely affected.

DETAILED DESCRIPTION

An LCD device according to a group of embodiments comprises: an array substrate having arrays of scanning and signal lines and pixel dots; a counter substrate; a liquid-crystal layer interposed between the array and counter substrates; liquid-crystal alignment layers arranged on the array and counter substrates, which induce alignment or orientation of liquid-crystal molecules in a direction along the array or counter substrate; a pattern of a light-shielding film (to be referred as a "black matrix" if appropriate) that is arranged on the counter or array substrate, in a configuration of a grating, which encompasses a latticework and a parallel grating or a pattern of parallel stripes; and a pattern of a color filter layer that is arranged on the counter or array substrate and has two or more color regions; and boundaries between the color regions are distanced respectively from centerlines of band-portions of the black matrix along the signal line, by not less than 1 μm. By such embodiments, it is able to curb or alleviate without increasing line widths of the black matrix or widths of the band-portions, a temporary display defect that may in otherwise appear at a time of switching from a "white display" or light-transmissive state into a "black display" or non-transmissive state.

The inventor has made investigation for further improving display quality of the LCD devices and has then happened to found following. Slight luminescence may occur in some circumstances and in some varieties of the LCD devices, only for two to three seconds right after switching pixel dots from light-transmissive state into non-transmissive state, at along one long side of rectangular shape of the pixel dot. During further investigation, the inventor has found that above-mentioned slight luminescence tends to occur when following (i) and (ii) are true, and especially when following (iii) is additionally true: (i) the counter substrate has a counter (common) electrode and the black matrix and has a relatively large extent of slanting and protrusions at portions where the black matrix overlaps other patterns; (ii) line widths (i.e. widths of band-portions) of the black matrix that make demarcations between the pixel dots are set to be small in order to improve aperture ratio and brightness of the display panel; and (iii) image display tests, especially for vehicle-mounted use, are made at a temperature in a range of 70° C. to 85° C.

During still further investigation, the inventor has found that such slight luminescence would occur at along a side of the pixel dot, which comes to upstream in a direction of proceeding the rubbing, that is, a side the rubbing is firstly made. It was also confirmed that rib-shaped protrusions are formed along boundaries between the color regions. During investigating elucidation and solutions for this puzzling phenomenon of the slight luminescence, it has happened to found that, if boundaries between the color regions of the color filter layer overlap the black matrix, offsetting the boundaries between the color regions respectively from centerlines of the band-shaped portions of black matrix would remarkably alleviate the phenomenon of the slight luminescence.

It is thus aimed to curb occurring of above-mentioned display defects even at very severe conditions, without damaging the aperture ratio, where an LCD device has alignment layers for aligning liquid-crystal molecules along the substrates and has, in the view area, a black matrix arranged as a grating as well as a pattern of a color filter layer having two or more color regions.

EMBODIMENTS

The LCD device of a detailed embodiment of the invention will be described with reference to FIGS. 1-3. The LCD device may be any among various modes of LCD devices, so far as arranged is an alignment layer that induces aligning of liquid-crystal molecules in a certain direction along the substrate. Thus, adoptable modes of the LCD devices are not only TN (Twisted Nematic) mode as in following detailed embodiment but also OCB (Optically Compensated Bend) mode and horizontal-electric field modes such as IPS mode. The alignment layer is achievable not only by the rubbing but also by irradiation with UV lights in a direction inclined to the substrate.

Figure 2:
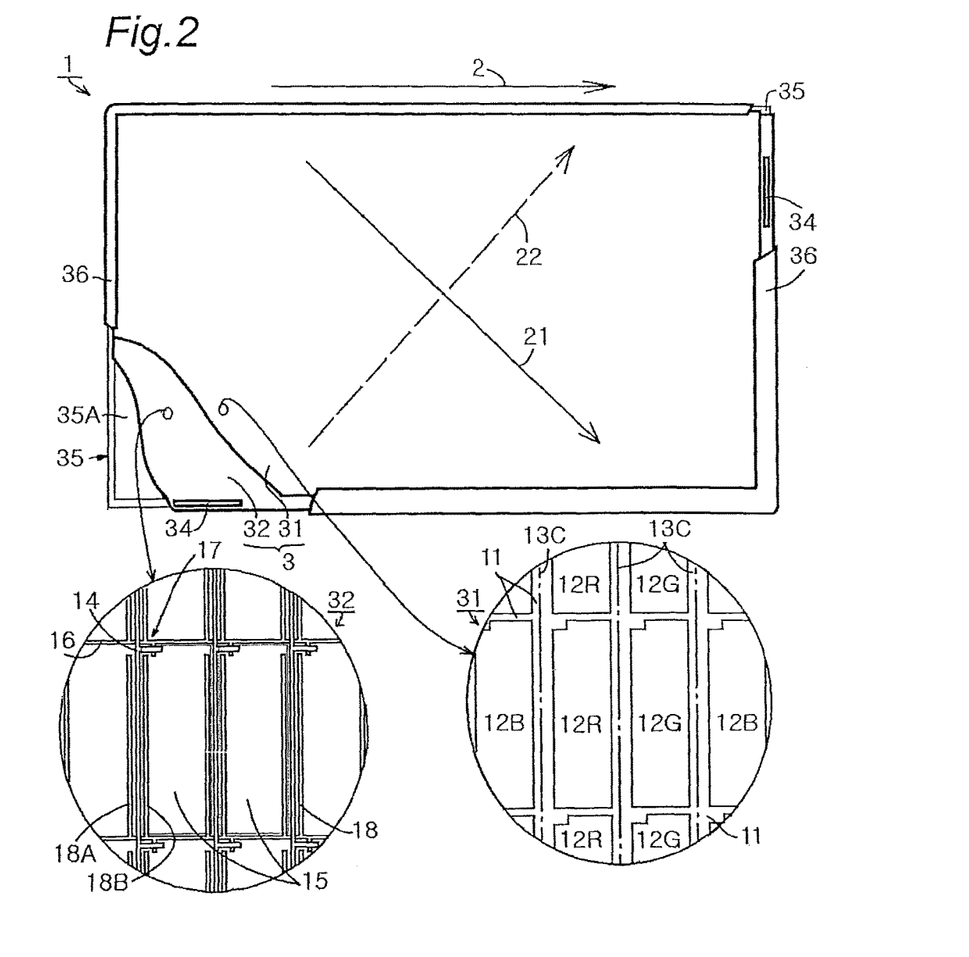
FIG. 2 is a partially-enlarged schematic plan view indicating the rubbing proceeding directions and a construction of pixel dots.

As shown in FIG. 2, the LCD device 1 of the embodiment comprises: an LCD panel 3; driver system including driver ICs 34 mounted on the LCD panel 3; a backlight device 35 arranged on rear side of the LCD panel 3; and a framework 36 covering up at least peripheries of the LCD panel 3 and the backlight device 35. The backlight device 35 comprises: a light-guide plate 35A; a light source formed of LEDs or a fluorescent lamp arranged along at least one side of the light-guide plate 35A; and a framework.

Figure 1:
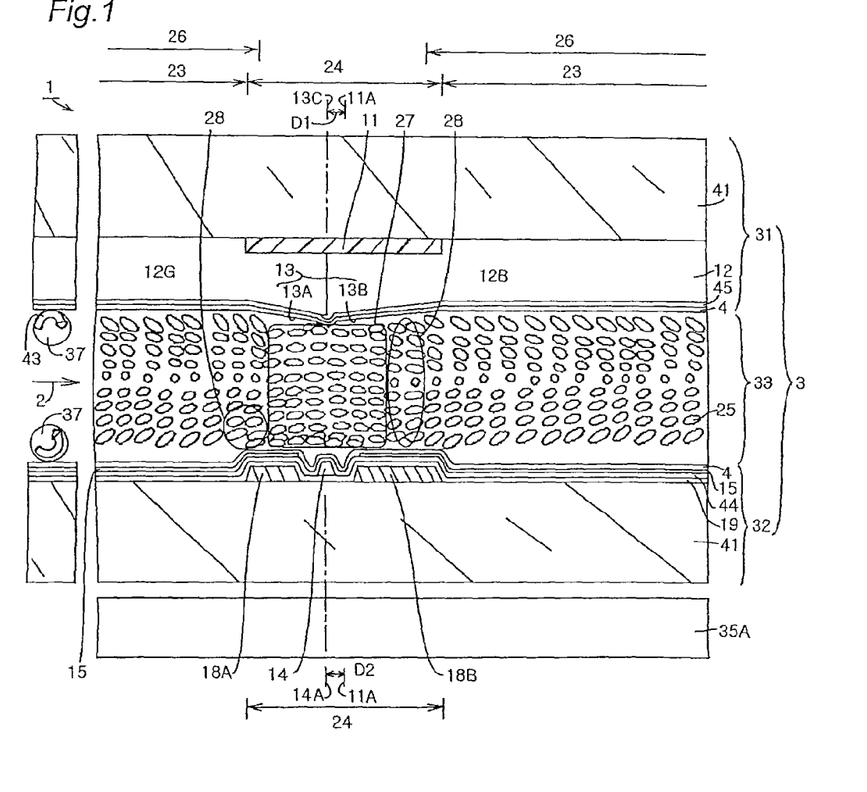
FIG. 1 is a schematic sectional view showing layers in a vicinity of a boundary between pixel dots, which is an essential part of an embodiment of the LCD device.

As shown in FIG. 1, the LCD panel 3 comprises: a counter substrate 31 and array substrate 32, each of which is formed of a glass substrate and which are adhered with each other through a sealing material arranged on the periphery; and a liquid-crystal layer 33 that is retained at inside of the panel, as sealed off from the air. In the illustrated embodiment, the array substrate 32 has on a patterned face contacting the liquid-crystal layer 33, an array of signal lines 14, an array of scanning lines 16 that substantially orthogonally intersect the signal lines in a manner of a latticework and has a TFT element 17 and a pixel electrode 15 for and at around each intersection of the signal and scanning lines. Moreover, from a vicinity of each of such intersections, auxiliary capacitance lines 18A and 18B are substantially orthogonally branched out from the scanning line 16 to run along the signal line 14 on its both sides. A gate insulator film 14 is arranged at between a patterned layer including the signal lines 14 and a patterned layer including the scanning lines 16; and an interlayer insulator film 44 as a flattening film having a relatively small thickness is arranged at between the patterned layer including the signal lines 14 and a patterned layer including the pixel electrodes 15. An alignment layer 4 is arranged as outermost layer of the substrate in a manner to cover up the pixel electrodes 15.

The counter substrate 31 has on its patterned face, a black matrix 11, which is formed of a light-shielding layer such as a metal layer (e.g. metal chromium layer) and a resin layer having black pigments, as well as a color filter layer 12 that is formed of a colored resin layer and covers the black matrix 11. A view area of the LCD panel 3 consists of: an area covered by the black matrix 11, as a light-shielding area 24; and remaining areas, each for a pixel aperture 23. In a detailed example shown in FIGS. 1-2, each of the auxiliary capacitance lines 18A and 18B sandwiching the signal line 14 has a fringe facing the pixel aperture 23, which coincides a fringe of the light-shielding area 24. Hence, widths of the auxiliary capacitance lines 18A and 18B are set to be large as possible so far as not to encroach on pixel aperture ratio, which is an area ratio of sum of the pixel apertures 23 to the view area of the LCD panel 1.

The color filter layer 12 is formed of a plurality of color regions 12R, 12B and 12G for realizing color displaying. In a detailed process, each of the color regions 12R, 12B and 12G is formed by processes including: application of resin liquid having pigments, light exposure with a mask pattern and development. When three of the color regions 12R, 12B and 12G are to be formed as in the present embodiment, the application and the light exposure are repeated three times. The color regions 12R, 12B and 12G may be arranged in stripes according to an embodiment and may thus be arranged in a manner as follows: one of the colors (e.g. red color) is assigned to each of the pixel electrodes 15 arranged in a line, to which a video signal is supplied through one of the signal lines 14; and another of the colors (e.g. green color) is assigned to each of the pixel electrodes 15 arranged in a next line, to which a video signal is supplied through next one of the signal lines 14.

The color filter 12 is covered as a whole by the counter electrode 45, which is formed of a transparent conductive material such as ITO. The counter electrode 45 is covered by an alignment layer 4, which is outermost layer of the counter substrate 31 and is typically formed of polyimide resin.

The counter substrate 31 has on a face contacting the liquid-crystal layer 33, a flat surface in each of the pixel apertures 23 and line-shaped or rib-shaped protrusions 13 extending along boundaries between the color regions 12R, 12G and 12B. Hence, within the light-shielding area 24 overlapping the black matrix 11, each of the rib-shaped protrusions 13 runs in a direction of the black matrix 11 and have slopes 13A and 13B on both sides of the protrusion 13.

The rib-shaped protrusions 13 and the slopes 13A and 13B are formed presumably because the resin liquid having the pigments for the color-filter layer 12 has a relatively low fluidity and, when applied, forms bulges at the black matrix 11 and/or a previously formed resin layer for the color filter 12. When the color regions are arranged in stripes as mentioned in the above, the protrusions 13 are formed only along the signal lines 14 or only on portions of the black matrix 11 along the signal lines 14.

At between the color filter layer 12 and the counter electrode 45, there may be arranged a flattening layer formed of transparent resin. The flattening layer having a large thickness would not be desirable in view of production cost. Even when the flattening layer having a relatively small thickness is arranged, the protrusions 13 and the slopes 13A and 13B would be remained on outermost surface of the patterned face on the counter substrate 31.

Figure 3:
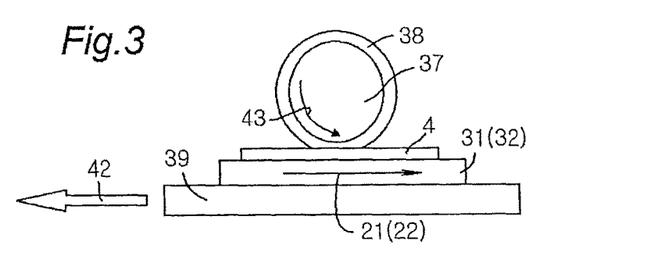
FIG. 3 is a schematic vertical sectional view indicating the rubbing process.

FIG. 3 schematically shows an example of a typical rubbing process. The counter substrate 31 or the array substrate 32, which has a resin layer for the alignment layer 4, is vacuum-chucked or held on a stage 39; and a rubbing roller 37 wound by a rubbing cloth 38 called as a buff is applied to the resin layer on the substrate. The rubbing roller 37 is rotated at a constant direction and at a substantially constant rate while the stage 39 is moved in a horizontal direction at a constant rate. In such rubbing process, rotation direction 43 of the rubbing roller 37 is set so that moving direction of the rubbing cloth 38 in vicinity of a surface of the substrate is reverse to or opposite to moving direction 42 of the stage 39. In this way, the rubbing is made to whole area of the counter substrate 31 or the array substrate 32.

Hereafter, a direction of proceeding the rubbing relative to the counter or array substrate 31 or 32 will be referred as "rubbing-proceeding direction" 21 or 22 respectively, which is reverse to the moving direction of the stage 39. In a detailed embodiment shown in FIG. 2, TN mode is adopted, and hence the rubbing-proceeding direction 21 of the counter substrate 31 is perpendicular to the rubbing-proceeding direction 22 of the array substrate 32. As shown in FIG. 2, typically, the rubbing-proceeding directions 21 and 22 are inclined to fringes of the counter and array substrates 31 and 32 by about 45 degrees. The rubbing may be made to a mother substrate in its diagonal or near diagonal direction at before cutting out the counter or array substrates from the mother substrate.

The alignment layer 4 inducing alignment and a pre-tilt angle of the liquid-crystal molecules may also be realized by light-induced alignment technique. A direction in same manner with the rubbing-proceeding direction may be determined for the alignment layer obtained by the light-induced alignment technique, on basis of conditions of the alignment layer. Thus, such a direction would be taken as and will be referred as the rubbing-proceeding direction for the alignment layer obtained by the light-induced alignment technique.

As shown in FIG. 2, overall direction relative to the signal lines 14 is derivable from the rubbing-proceeding directions 21 and 22 on the counter and array substrates. Such overall direction will be hereinafter referred as rubbing direction 2. In an embodiment illustrated in FIG. 2, right-hand side relative to any of the signal lines 14 is downstream of the rubbing direction 2; thus, a direction from left-hand side to right-hand side is to be referred as the rubbing direction 2. Influence by the rubbing-proceeding direction 21 on the counter substrate 31 would be larger than influence by the rubbing-proceeding direction 22 on the array substrate 32.

As schematically indicated on left-hand-side end of FIG. 1, rightward direction in FIG. 1 is the rubbing direction 2. As schematically illustrated in FIG. 1, a pre-tilt angle 25 in the rubbing direction is imparted to liquid-crystal molecules 25 contacting the alignment layer 4. The pre-tilt angle and orientation of the liquid-crystal molecules are set so that, for any of the liquid-crystal molecules 25, a distance from the substrate increases with proceeding in the rubbing direction 2 along the liquid-crystal molecule 25. In vicinity of surface of the substrate, due to the pre-tilt angle and the orientation imparted to the liquid-crystal molecules, applying of voltage to the liquid-crystal layer 33 induces substantially vertical orientation of the liquid-crystal molecules 25, throughout substantially whole thickness dimension of the liquid-crystal layer 33, so as to realize a black display when the LCD device is in a normally-white mode.

The pre-tilt angle and the orientation of the liquid-crystal molecules 25 are disturbed at the protrusions 13 in the light-shielding area 24. Such disturbing is made in vicinity of the counter substrate 31 at portions contacting the slopes 13A and 13B of the protrusions 13. Such disturbing would also be made in vicinity of the array substrate 32 due to horizontal electric field between the signal lines 14 and the auxiliary capacitor lines 18A and 18B. Among the right-hand-side and left-hand-side slopes 13A and 13B on each of the protrusions 13, the slope 13A on upstream in the rubbing direction 2 is subjected to "wind-up-wise rubbing" as it were, by the rubbing cloth 38 as from bottom to top of the slope at a time of the rubbing process as indicated in FIG. 3. Thus, the rubbing would be made as relatively sufficient.

On the other hand, the slope 13B on downstream in the rubbing direction 2, of the protrusion 13 is subjected to "wind-down-wise rubbing" as it were, by the rubbing cloth 38 as from top to bottom of the slope at a time of the rubbing process as indicated in FIG. 3. It is presumed that the rubbing may become insufficient on the slope 13B on downstream of the rubbing direction, compared to other areas.

Meanwhile, in vicinity of surface of the array substrate 32, horizontal electric field is formed between the signal lines 14 on one hand, and the auxiliary capacitor lines 18A and 18B and the pixel electrodes 15 on the other hand. Thus, in a narrow area sandwiched by the auxiliary capacitor lines 18A and 18B as well as in areas adjacent to such narrow area, the pre-tilt angles of the liquid-crystal molecules 25 would become smaller than in other areas. Such narrow area and the adjacent areas usually overlap respective one of the protrusions 13, and thus would undergo disturbance by the slopes 13A and 13B, to form a poorly-pre-tilted region 27 in most occasions.

FIG. 1 schematically indicates presence of: the poorly-pre-tilted region 27 at an area overlapping each of the protrusions 13; and imperfectly-pre-tilted region 28 at just downstream of the poorly-pre-tilted region 27. In a detailed embodiment schematically illustrated in FIG. 1, the imperfectly-pre-tilted region 28 might be partly formed on upstream of the poorly-pre-tilted region 27. Nevertheless, such region on the upstream would be formed only on vicinity of the array substrate 32 and thus have relatively small disturbance of the pre-tilt angle; and hence the region on upstream of the poorly-pre-tilted region 27 as a whole would in most occasions form a normally-pre-tilted region 26 or near-normally-pre-tilted region.

The imperfectly-pre-tilted region 28 is arranged to be biased or offset to downstream of the rubbing direction 2, relative to the protrusion 13 presumably because followings. On the slope 13A on the upstream for "wind-up-wise rubbing", fibers of the rubbing cloth 38 would collide with the slope 13A, and thus, the rubbing would be less likely disturbed. Moreover, inclination of the slope 13A, in terms of clockwise or anticlockwise direction of the inclination relative to not-inclined state, coincides with that of pre-tilting; thus, inclination of the liquid-crystal molecules 25 to a plane of the glass substrate 41 would become large; and hence, relatively small effect would be inflicted upon converting of arrangement of the liquid-crystal molecules 25 from coiled arrangement to nearly vertical arrangement or upon response time for conversion from white display to black display by.

On the slope 13B on the downstream for "wind-down-wise rubbing", situations opposite to the above would be true; and thus, the pre-tilt angle is more likely disturbed. Moreover, the clockwise or anti-clockwise direction of inclination of slope 13B is opposite to that of pre-tilting; thus, inclination of the liquid-crystal molecules 25 to a plane of the glass substrate 41 would become small; and hence, when switching from white display to black display, a response time would be prolonged for converting of arrangement of the liquid-crystal molecules 25 from coiled arrangement to nearly vertical arrangement.

When the pre-tilt angle and/or the like is greatly deviated from normal one, the above-mentioned display defect would occur. Such great deviation or abnormality of the pre-tilt angle would hamper prompt response and considerably prolong a time for switching from light-transmissive state to non-transmissive state at a pixel dot, typically by switching from white display to black display in a normally white mode of the LCD device. In particular, the time for switching from white display to black display would be further prolonged because the angle of the liquid-crystal molecules 25 to the glass substrate 41 would become small due to the direction of the inclination of the slope 13B.

As indicated in FIG. 1, the boundaries 13C between the color regions is deviated from respective centerline 11A of band portions of the black matrix 11 (to be referred as black-matrix centerlines 11A), to upstream of the rubbing direction 2 by a proper distance D1, according to the embodiment shown here. Moreover, in this embodiment, each of the signal lines 14 is also deviated from black-matrix centerlines 11A, to upstream of the rubbing direction 2 by a proper distance D2. Here, in order to curb undermining of the aperture ratio, two outer fringes of a pair of the auxiliary capacitor lines 18A and 18B, which are fringes not facing the signal line 14 between them, are arranged to coincide with right-hand and left-hand side fringes of the black matrix 11. In other words, horizontal distance from the outer fringe of each of the auxiliary capacitor lines 18A and 18B to respective fringe of the black matrix 11 is set to be less than 0.5 μm at most. Thus, in response to offsetting of each of the signal lines 14, the auxiliary capacitor line 18A on the upstream is narrowed while the auxiliary capacitor line 18B on the downstream is widened. Because a gap between each of the signal lines 14 and either of the auxiliary capacitor lines 18A and 18B is constant, increase or decrease of width of either of the auxiliary capacitor lines 18A and 18B matches the distance D2 of offsetting the signal lines 14 to the upstream. The distance D2 of offsetting a centerline 14A of each of the signal lines 14 (to be referred as signal-line centerlines 14A) from the black-matrix centerlines 11A may be set to be equal to or smaller than the distance D1 of offsetting each of the boundaries 13C between the color regions.

Offsetting of the boundaries 13C between the color regions as well as the signal lines 14 respectively from the black-matrix centerlines 11A is made so that whole of each of the imperfectly-pre-tilted regions 28 is arranged within the light-shielding area 24. In particular, each of the normally-pre-tilted regions 26 extends to inside of the light-shielding area 24 to secure a sufficient margin for alignment errors, at between a fringe of the normally-pre-tilted regions 26 and a respective fringe of the light-shielding area 24. Thus, even when alignment precision between patterning processes for producing the counter or array substrate 31 or 32 is not so high, alignment errors would be absorbed by the above-mentioned margin.

In a detailed embodiment illustrated in FIG. 1, the distance D2 of offsetting the signal-line centerlines 14A with respect to the black-matrix centerlines 11A is equal to the distance D1 of offsetting the boundaries 13C between the color regions with respect to the black-matrix centerlines 11A. Thus, each of the centerlines 14A of the signal lines 14 coincides with a respective one of the boundaries 13C between the color regions in a plan view of the LCD panel 3. Hence, as in a detailed example illustrated in FIG. 2, each of the poorly-pre-tilted regions 27 would be centered on respective one of the boundaries between the color regions 13C of the protrusions 13 in a manner to have a line-symmetrical distribution about the boundaries 13C between the color regions.

Moreover, the boundary 13C between the color regions, at which thickness of the color filter layer is larger than other areas, is overlapped or aligned with one of the signal lines 14 having a relatively small thickness of conductive layer within the array substrate. In this way, it is able to decrease incidence of defects such as luminous points, which may in otherwise be caused by short-circuiting between the counter electrode 45 and the pixel electrodes 15 due to foreign particles or protrusions at around the boundaries 13C between the color regions.

In a more detailed embodiment, the distance D1 of offsetting the boundaries 13C between the color regions of the protrusions 13 and the distance D2 of offsetting the signal-line centerlines 14A, from respective one of the black-matrix centerlines 11A, are no less than 0.5 μm, preferably no less than 0.7 μm and more preferably no less than 1.0 μm and are no less than 2.0 μm for example.

At least 5 μm to 7.5 μm is minimum distance between the signal-line centerlines 14A and a fringe of the black matrix 11 if at least 2 μm to 3 μm is each of: a width of each of the auxiliary capacitive lines 18A; a width of each of the signal lines 14; and a gap between each of the signal line 14 and either of the auxiliary capacitor lines 18A. The above-mentioned D2 has to be no more than a balance between a half width of the band-portion of the black matrix 11 and the above minimum distance, or no more than a value obtained by subtracting the minimum distance from the half width. When the width of the band portion of the black matrix 11, along the signal line 14, is about 20 μm, upper limit of the distance D2 will be in a range of 2.5 μm to 5 μm as varied with the width of the signal line 14 and/or with other dimensions. Hence, when the width of each band portion of the light-shielding area 24, which is equal to that of the black matrix 11, is in a range of 15 μm to 25 μm; then, the above-mentioned distance D2 may be set in general in a range of 0.7 μm to 5 μm and especially in a range of 1.0 μm to 3 μm. In such occasion, the above-mentioned distance D1 may be set to be larger than the distance D2, and may be properly selected from a range of 1 μm to 8 μm. In otherwise, the distance D1 may be set to be equal or substantially equal to the distance D2, and may be set to be no more than 5 μm for example and no more than 3 μm in particular. In a detailed embodiment explained here, thickness of the color filter layer 12 is no less than 1 μm, no less than 1.5 μm in particular and no less than 2 μm for example.

In a detailed example, the band portions of both of the black matrix 11 and the light-shielding area 24 have 20 μm of width dimensions; and both of the above distances D1 and D2 are in a range of 1.0 μm to 2 μm. In this detailed example, sum of width dimensions of the auxiliary capacitor lines 18A and 18B in a pair, on upstream and downstream of one of the signal lines 14, is 12 μm; width dimension of each of the signal lines 14 is 3 μm; and a gap between such one of the signal lines 14 and either of the auxiliary capacitor lines 18A and 18B in the pair is 2.5 μm. In accordance with this detailed example, WXGA widescreen LCD devices having 7 inches of orthogonal dimensions of view areas were manufactured in a trial basis, using a plurality of trial production lines. Then, thus produced LCD devices were tested by keeping them in a severe ambience of about 85° C., to make the white display on whole of the view area for fifteen seconds or more and subsequently by switching to the black display on whole of the view area. As a result, no defect was observed at all in a screen of such all-out black display. In particular, never observed was the temporary display defect of luminescence in a streak in any of the pixel dots, just after the switching.

Figure 4:
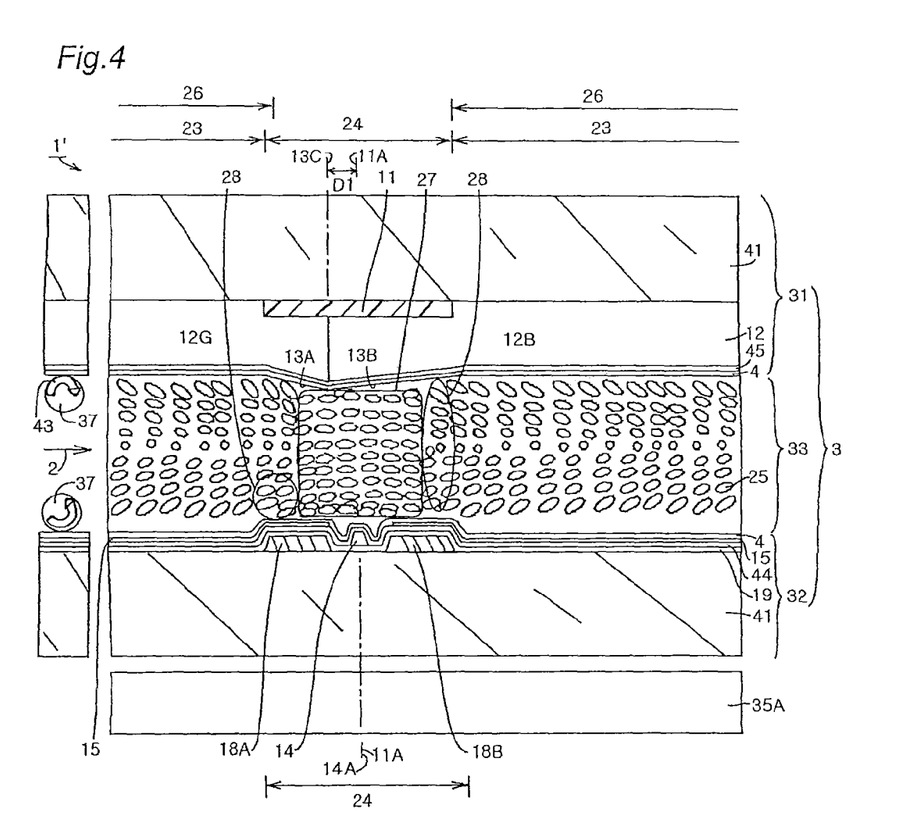
FIG. 4 is a schematic sectional view showing layers, corresponding to FIG. 1 and showing an essential part of a modified embodiment of the LCD device.

FIG. 4 shows an essential part of an LCD device 1' according to another embodiment, by a schematic cross-sectional view showing layers. In this embodiment, the signal-line centerlines 14A are arranged to coincide respectively with the black-matrix centerlines 11A so that the auxiliary capacitor lines 18A and 18B on left-hand and right-hand sides in the view, of one of the signal lines 14, have same dimensions with each other. Despite of this, in this embodiment, the distance D1 for offsetting the boundaries 13C between the color regions from the black-matrix centerlines 11A to the upstream is set to be larger than that in the embodiment shown in FIG. 1. The distance D1 may be in a range of 6 μm to 8 μm, especially in a range of 7 μm to 8 μm in a following detailed dimensional setting—each width dimension of the band portions of the black matrix 11 and the light-shielding area 24 is about 20 μm; and the distance between the centerlines 11A and 14A of the signal lines 14 and the band portions of the black matrix 11 is less than 0.5 μm. According to detailed dimensional setting, the distance D1 may be in a range of 4 μm to 6 μm. Except for the above differences, the embodiment of FIG. 4 is identical with the embodiment of FIG. 1, including dimensions in the detailed example. The distance D1 may be varied in accordance with varying of widths of the black matrix 11 and/or other dimensions. When the width dimensions of band portions of the black matrix 11 and the light-shielding area 24 are in a range of 15 μm to 25 μm and in same time when the distance from one of the signal-line centerlines 14A to respective one of the black-matrix centerlines 13A is less than 0.5 μm; and then, the distance D1 may be set in general to be not less than 5 μm, preferably not less than 6 μm and more preferably not less than 7 μm.

An LCD device according to the above detailed example of the embodiment of FIG. 4 was manufactured in a standard trial production line and was tested as mentioned before in respect of the embodiment of FIG. 1. As a result, no display defect was observed. Nevertheless, in an example schematically shown in FIG. 4, the imperfectly-pre-tilted region 28 has a fringe on downstream in the rubbing direction, which coincides or substantially coincides a fringe of the light-shielding area 24 on the downstream. Thus, a margin for absorbing alignment errors would be considerably small between the fringes of the imperfectly-pre-tilted region 28 and the light-shielding area 24. Thus, when manufacturing apparatus has considerably large alignment errors, the slight luminescence in streaks may occur at a portion of the pixel dots in a portion of products of the LCD devices, temporarily just after switching to the black display from the white display.

Figure 5:
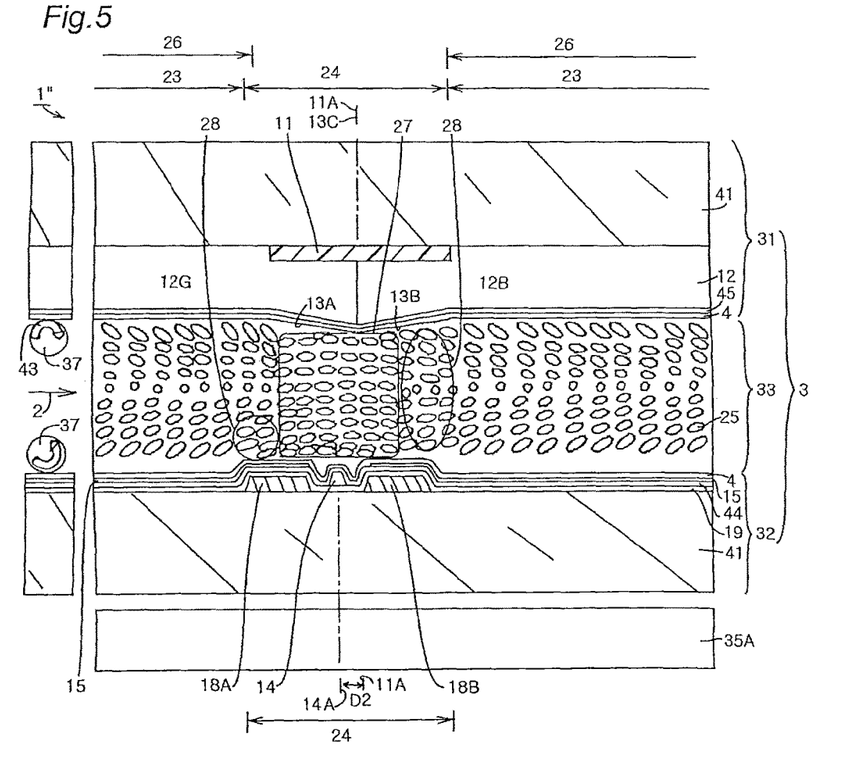
FIG. 5 is a schematic sectional view showing layers, corresponding to FIG. 1 and showing an essential part of a reference example of the LCD device.

FIG. 5 shows an essential portion of an LCD device 1" according to a reference example, by a schematic cross-sectional view showing layers as in the FIG. 1. As shown in FIG. 5, the boundaries 13C between the color regions are arranged to coincide with the black-matrix centerlines 11A while the signal-line centerlines 14A are distanced from the black-matrix centerlines 11A, by the distance D2 toward upstream of the rubbing direction 2. Moreover, the width dimensions of the auxiliary capacitor lines 18A and 18B on right-hand and left-hand sides of each of the signal lines 14 are equal to each other. Other than these features, the LCD device 1" of the reference example is totally identical with the LCD device 1 of the FIG. 1 even between the detailed examples. In particular, they are identical even in that: the width dimension of the band portion (along the signal line 14) of the black matrix 11 is identical with a distance from upstream fringe of upstream-side auxiliary capacitor line 18A to downstream fringe of downstream-side auxiliary capacitor line 18B. In other words, they are identical even in that: the width dimension of the band portion (along the signal line 14) of the black matrix 11 is identical with a width dimension of a light-shielding entity as a combination of the auxiliary capacitor lines 18A and 18B in a pair.

Hence, the upstream fringe of upstream-side auxiliary capacitor line 18A comes out toward upstream from the upstream fringe of the black matrix 11, by the distance D2. The downstream fringe of the downstream-side auxiliary capacitor line 18B is arranged as deviated from the downstream fringe of the black matrix 11 toward upstream by the distance D2. Thus, even with the LCD device 1" of the reference example, the display defect would be averted in a level same with the LCD device 1' of FIG. 4. Nevertheless, the width dimension of band portions (along the signal line 14) of the light-shielding area 24 increases by the distance D2 so that the aperture ratio decreases accordingly.

Figure 6:
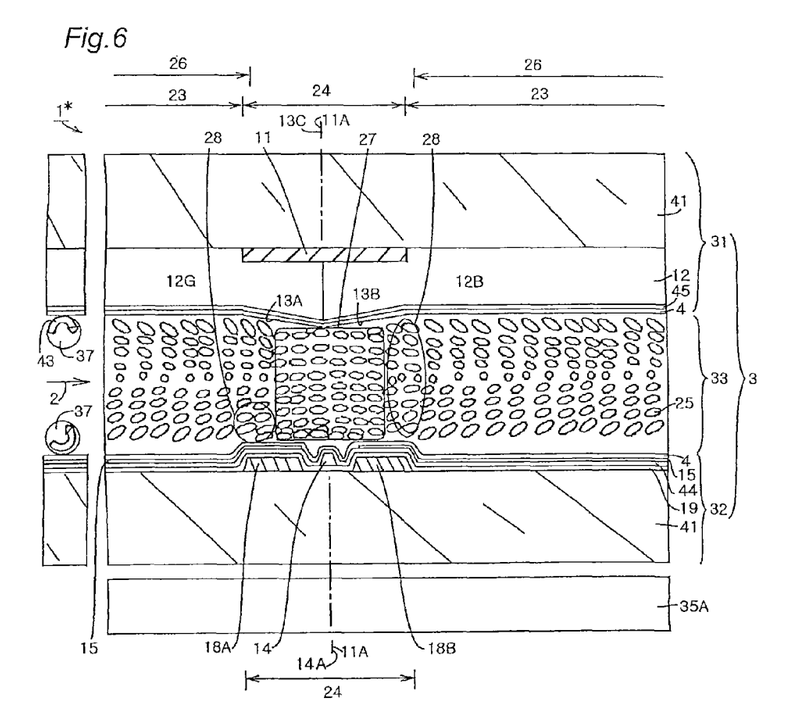
FIG. 6 is a schematic sectional view showing layers, corresponding to FIG. 1 and showing an essential part of a comparative example of the LCD device.

FIG. 6 shows an essential portion of an LCD device 1\* according to a comparative example, by a schematic cross-sectional view showing layers as in the FIG. 1. As shown in FIG. 6, the boundaries 13C between the color regions respectively coincide with the black-matrix centerlines 11A and with the signal-line centerlines 14A; and width dimensions of the auxiliary capacitor lines 18A and 18B in a pair, on right-hand and left-hand sides of each of the signal lines 14 are same with each other. Except for these features explained hereto, the LCD device 1\* of the comparative example is identical with the LCD devices of the embodiments such as in FIG. 1, even among the detailed examples. In particular, width dimension of the band portions (along the signal line 14) of the light shielding area 24 is same with the width dimension of the band portions (along the signal line 14) of the black matrix 11 and with a span between outer fringes of the auxiliary capacitor lines 18A and 18B in a pair.

In an example schematically shown in FIG. 6, the imperfectly-pre-tilted region 28 extends toward downstream of the rubbing direction 2, into the pixel aperture 23. Thus, according to particular conditions, the above-mentioned temporary display defect will occur.

Figure 7:
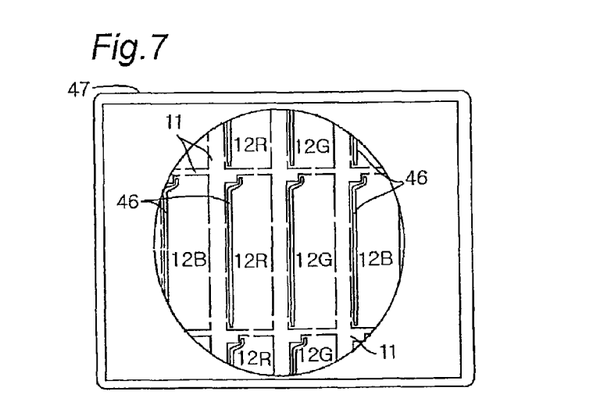
FIG. 7 is a partial plan view indicating a display defect that may appear when the LCD device of FIG. 6 is operated at high temperature.

FIG. 7 schematically indicates occurring of such temporary display defect. FIG. 7 shows a display screen 47 of a microscope, in which several pixels of the LCD device 1\* of the comparative example are shown as enlarged. Here, the LCD device was subjected to a dynamic operating inspection at an ambience of 85° C., in which every pixel dot of the display panel was kept to make white display for 15 seconds or more and then was switched to black display. FIG. 7 shows a state just after such switching and indicates appearing of streak-shaped light leakage 46 at along one side of each pixel dot. The streak-shaped light leakage 46 occurs on upstream side in the rubbing direction, of each pixel dot.

Disclosures in respect of the embodiments are only for sake of examples, and modifications easily conceivable by a skilled person in the art without departing from the gist of the invention are included in the scope of the invention as a matter of course. For sake of clarity, drawings may be schematically illustrated in terms of width, thickness and shape of the elements and/or parts differently from the reality. Illustrations in the drawings are mere examples, and are not intended to limit the scope of the invention.

What is claimed is:
1. A liquid-crystal display (LCD) device comprising:
an array substrate having an array of scanning lines and an array of signal lines, in a view area;
a counter substrate;
a liquid-crystal layer held between the substrates; and
a liquid-crystal alignment layer that causes aligning of liquid-crystal molecules in a direction along the substrates;
the array substrate or the counter substrate further comprising:

a pattern of color filter layer, formed of a plurality of color regions;

a pattern of a light-shielding film, comprising band-shaped portions that run along boundaries of the color regions; and protrusions that are formed by the color filter layer and run along the boundaries between the color regions; and the boundaries being respectively deviated from centerlines of the band-shaped portions by 1 μm or more, wherein in a manner to sandwich each of the signal lines in a plan view, auxiliary capacitor lines are arranged in parallel with the signal lines, width dimensions of the auxiliary capacitor lines differ among those sandwiching a portion of one of the signal lines, and the width dimensions of the auxiliary capacitor lines are increased and decreased according to a distance of offsetting the centerlines of the signal lines respectively from the centerlines of the band-shaped portions.

2. The LCD device according to claim 1, wherein centerlines of the signal lines are respectively deviated from the centerlines of the band-shaped portions by 1 μm or more.

3. The LCD device according to claim 1, wherein the boundaries between the color regions are deviated toward upstream of rubbing direction, respectively from the centerlines of the band-shaped portions.

4. The LCD device according to claim 1, wherein centerlines of the signal lines are deviated toward upstream of rubbing direction, respectively from the centerlines of the band-shaped portions.

5. The LCD device according to claim 2, wherein a distance of offsetting the centerlines of the signal lines respectively from the centerlines of the band-shaped portions is no more than 5 pm; and a distance of offsetting the boundaries respectively from the centerlines of the band-shaped portions is no more than 8 pm.

6. The LCD device according to claim 1, wherein a thickness of the color filter layer is not less than 1 μm.

7. The LCD device according to claim 2, wherein when width dimension of the band-shaped portion is in a range of 15 μm to 25 μm, a distance of offsetting the centerlines of the signal lines respectively from the centerlines of the band-shaped portions and a distance of offsetting the boundaries respectively from the centerlines of the band-shaped portions are both no more than 3 μm.

8. The LCD device according to claim 1, wherein lights passing through the liquid-crystal layer are interrupted at a time a voltage is applied to the liquid-crystal layer, as a normally white mode.

* * * * *